(12) United States Patent
Molin et al.

(10) Patent No.: US 10,122,444 B2
(45) Date of Patent: Nov. 6, 2018

(54) METHOD FOR CHARACTERIZING PERFORMANCE OF A MULTIMODE FIBER OPTICAL LINK AND CORRESPONDING METHODS FOR FABRICATING A MULTIMODE OPTICAL FIBER LINK SHOWING IMPROVED PERFORMANCE AND FOR IMPROVING PERFORMANCE OF A MULTIMODE OPTICAL FIBER LINK

(71) Applicant: DRAKA COMTEQ B.V., Amsterdam (NL)

(72) Inventors: Denis Molin, Paron (FR); Pierre Sillard, Paron (FR); Marianne Bigot, Paron (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 15/531,999

(22) PCT Filed: Dec. 1, 2014

(86) PCT No.: PCT/IB2014/002943
§ 371 (c)(1),
(2) Date: May 31, 2017

(87) PCT Pub. No.: WO2016/087892
PCT Pub. Date: Jun. 9, 2016

(65) Prior Publication Data
US 2017/0331549 A1 Nov. 16, 2017

(51) Int. Cl.
*H04B 10/073* (2013.01)
*H04B 10/079* (2013.01)
(Continued)

(52) U.S. Cl.
CPC ... *H04B 10/07951* (2013.01); *H04B 10/0731* (2013.01); *H04B 10/2581* (2013.01); *H04B 10/69* (2013.01)

(58) Field of Classification Search
CPC ........... H04B 10/073–10/0731; H04B 10/2581
See application file for complete search history.

(56) References Cited

U.S. PATENT DOCUMENTS 6,064,786 A * 5/2000 Cunningham ........... G02B 6/14
383/27
6,400,450 B1 6/2002 Golowich
(Continued)

FOREIGN PATENT DOCUMENTS

EP 2207022 A1 7/2010

OTHER PUBLICATIONS

International Preliminary Report on Patentability for PCT/IB2014/002943 dated Jun. 6, 2017 (6 pages).
(Continued)

*Primary Examiner* — Shi K Li
(74) *Attorney, Agent, or Firm* — Shumaker, Loop & Kendrick, LLP

(57) ABSTRACT

Disclosed is a method of characterizing a multimode optical fiber link including a light source and two or more multimode fibers. The method includes a step of characterizing each of said multimode fibers using a measurement of the Dispersion Modal Delay (DMD) for each of said multimode fibers, and delivering, for each of said multimode fibers, at least three fiber characteristic curves as a function of a radial offset value r; a step of characterizing the light source by at least three source characteristic curves showing at least three parameters of the source as a function of a fiber radius r and obtained by a technique similar to the DMD measurement; and a step of computing an Effective Bandwidth (EB) of the link, comprising calculating a transfer function using both each of said source characteristic curves and each of said at least three fiber characteristic curves for each of said multimode fibers.

12 Claims, 9 Drawing Sheets

(51) Int. Cl.
   *H04B 10/2581*   (2013.01)
   *H04B 10/69*   (2013.01)

(56) References Cited

U.S. PATENT DOCUMENTS

| | | |
|---|---|---|
| 6,788,397 B1 | 9/2004 | Golowich et al. |
| 9,871,584 B2* | 1/2018 | Molin .................. G01M 11/332 |
| 2011/0054861 A1 | 3/2011 | Lane |
| 2012/0099099 A1* | 4/2012 | Tudury ................ G01M 11/335 |
| | | 356/73.1 |

OTHER PUBLICATIONS

Abhijit Sengupta, "Calculated Modal Bandwidths of an OM4 Fiber and the Theoretical Challenges", International Wire & Cable Symposium, Proceedings of the 58th IWCS/IICIT, (2009).
International Search Report for PCT/IB2014/002943 dated Sep. 23, 2015 (3 pages).
"FOTP-220, TIA-455-220-A: Differential Mode Delay Measurement of Multimode Fiber in Time Domain", EIA/TIA Standards, Telecommunications Industry Associations, Arlington, VA, US vol. 455-200-a, Jun. 1, 2003, p. 1-23. (the International Search Report for PCT/IB2014/002943 is provided as serving a concise explanation for this reference according to MPEP 609.04 (a)III.).

\* cited by examiner

METHOD FOR CHARACTERIZING PERFORMANCE OF A MULTIMODE FIBER OPTICAL LINK AND CORRESPONDING METHODS FOR FABRICATING A MULTIMODE OPTICAL FIBER LINK SHOWING IMPROVED PERFORMANCE AND FOR IMPROVING PERFORMANCE OF A MULTIMODE OPTICAL FIBER LINK

FIELD OF THE INVENTION

The present invention relates to the field of optical fiber transmissions, and more specifically, to multimode fibers used in (relative) long reach and high bitrate systems. More specifically, the invention relates to a method of characterizing a multimode optical fiber link, comprising a light source and several multimode fibers, used in such optical transmission systems.

BACKGROUND

Multimode fibers are successfully used in high-speed data networks together with high-speed sources that are typically using transversally multimode vertical cavity surface emitting lasers, more simply called VCSELs.

The Effective Bandwidth drives the performance of a system comprising multimode fibers and a light source such as a VCSEL, and allows assessing the highest bit rate achievable and/or the longest reach achievable.

The Effective Bandwidth results from the combination of the modal dispersion and the chromatic dispersion.

Modal dispersion results from the fact that, in a multimode fiber, for a particular wavelength, several optical modes propagate simultaneously along the fiber, carrying the same information, but travelling with different propagation velocities. Modal dispersion is expressed in terms of Differential Mode Delay (DMD), which is a measure of the difference in pulse delay (ps/m) between the fastest and slowest modes traversing the fiber.

In order to minimize modal dispersion, the multimode optical fibers used in data communications generally comprise a core showing a refractive index that decreases progressively going from the center of the fiber to its junction with a cladding. In general, the index profile is given by a relationship known as the "α profile", as follows:

$$n(r) = n_0 \sqrt{1 - 2\Delta\left(\frac{r}{a}\right)^\alpha} \text{ for } r \leq a,$$

where:
$n_0$ is a refractive index on an optical axis of a fiber;
r is a distance from said optical axis;
a is a radius of the core of said fiber;
Δ is a non-dimensional parameter, indicative of an index difference between the core and a cladding of the fiber; and
α is a non-dimensional parameter, indicative of a shape of the index profile.

When a light signal propagates in such a core having a graded index, the different modes experience a different propagation medium, which affects their speed of propagation differently. By adjusting the value of the parameter α, it is thus possible to theoretically obtain a group velocity, which is virtually equal for all the modes and thus a reduced intermodal dispersion for a particular wavelength. However, an optimum value of the parameter α is valid for a particular wavelength only. Furthermore, the exact parameter value α, as well as the actual shape of the refractive index profile, are difficult to control during manufacture of the fiber.

It is thus important to take account of modal dispersion when assessing the effective bandwidth of a multimode optical fiber link.

As mentioned above, the Effective Bandwidth is also affected by the chromatic dispersion, also called material dispersion. Chromatic dispersion occurs because the refractive index of a material changes with the wavelength of light. As a consequence, different wavelengths travel at different speeds in a multimode fiber. Since a pulse of light typically comprises several wavelengths, the spectral components of the optical signal spread in time, or disperse, as they propagate, causing the pulse width to broaden. A multimode fiber typically has a chromatic dispersion of the order of −100 ps/nm-km at a wavelength of 850 nm. The chromatic dispersion can vary between −80 and −120 ps/nm-km in the spectral range 840-860 nm.

Originally, modal and chromatic dispersions have been assumed to act independently. As a consequence, the Effective Bandwidth (EB), which corresponds to the bandwidth of the fiber when both the modal dispersion and the chromatic dispersion are taken into account, has long been assessed as the result of an independent combination of the Effective Modal Bandwidth (EMB), which corresponds to the bandwidth of the source-fiber pair when the chromatic dispersion is disregarded, and a Chromatic Dispersion Bandwidth (BWch).

More precisely, the Chromatic Dispersion Bandwidth is determined from the spectral width for the VCSEL, by taking account of the nominal value of the chromatic dispersion of the fiber. Actually, the chromatic dispersion is considered as not varying so much from fiber to fiber.

The Chromatic Dispersion Bandwidth is hence calculated as follows:

$$BW_{ch} = \frac{0,187}{L.\sigma} \cdot \frac{10^{12}}{\sqrt{(D_1)^2 + (D_2)^2}} \text{ with } D_1 = \frac{S_0}{4} \cdot \left[\lambda_c - \frac{(\lambda_0)^4}{(\lambda_c)^3}\right]$$

and $$D_2 = 0,7.\sigma.S_0,$$

where:
L is the link length in kilometers;
σ is the root mean square (rms) optical spectral width of the laser source in nm;
$\lambda_0$ is the wavelength of zero dispersion of the fiber in nm;
$\lambda_c$ is the center wavelength of the laser;
$S_0$ is the dispersion parameter of the fiber in ps/(km·nm)².

As regards Effective Modal Bandwidth, it is usually estimated by a measurement of the delay due to the modal dispersion, known under the acronym DMD for "Dispersion Modal Delay" graphical representation. The DMD measurement procedure has been the subject of standardization (IEC 60793-1-49 and FOTP-220) and is also specified in Telecommunications Industry Association Document no. TIA-455-220-A. The DMD metric is expressed in units of picoseconds per meter (ps/m) so that the total delay is normalized by fiber length. Low modal dispersion as measured by DMD generally results in higher-bandwidth MMF.

A DMD graphical representation is obtained by injecting a light pulse having a given wavelength $\lambda_0$ at the center of the fiber and by measuring the pulse delay after a given fiber length L; the introduction of the light pulse of given wavelength $\lambda_0$ being radially offset to cover the entire core of the multimode fiber.

Once the Effective Modal Bandwidth and the Chromatic Dispersion Bandwidth have been assessed, the total bandwidth, also called Effective Bandwidth is calculated as follows:

$$EB = \frac{1}{\sqrt{\frac{1}{EMB^2} + \sqrt{\frac{1}{BW_{ch}^2}}}}$$

However, for relatively long reach and at high bit rate, and especially in case of transversally multimode sources, source and fiber do not drive the system performance independently, because of Modal and Chromatic Dispersion Interactions (MCDI).

Actually, the sources used in optical transmission systems are generally not monochromatic. Thus, the widely used VCSELs have a wide-spectrum discrete emission. The VCSELs used for high-speed transmissions are generally longitudinally but not transversally single mode, each transverse mode of the laser having its own wavelength corresponding to the various peaks of the emission spectrum. The emission spectrum thus has a spatial dependence.

When the optical signal emitted by the VCSEL is introduced into the multimode fiber, each transverse mode of the VCSEL will diffract differently: the transverse modes of the highest order diverge more rapidly due to their phase and the spatial distribution of their energy, they will therefore be coupled more specifically in the high order modes of the fiber. It will be recalled that the high order modes of the VCSEL occupy the lowest wavelengths in the spectrum. This spectral and spatial distribution of the VCSEL modes results in the highest order modes of the fibers mostly carrying the lowest wavelengths in the spectrum: the chromatic dispersion will therefore further delay the higher order modes relative to the delay of the fundamental mode.

The chromatic dispersion will thus introduce a modal dispersion referred to by the acronym MCDI for "Modal and Chromatic Dispersion Interferences", resulting in a limitation of the bandwidth.

Document US 2011/0054861 A1 stresses the fact that the currently standardized algorithms for determining DMD and EMB, though adequate for appraising the quantitative amount of modal dispersion of a particular fiber at a particular measurement wavelength, do not correctly address both modal and chromatic dispersion effects, and discloses an improved algorithm for calculating the bandwidth of a particular laser transmitter and fiber combination, aiming at correctly combining both modal and chromatic dispersion effects.

According to this prior art document, a total bandwidth accounting for both chromatic and modal dispersions is assessed through the computation of a transfer function $H_{fiber}(f,n)$, determined by deconvolving the launch reference pulse R(t) used in the DMD measurements, from the output temporal responses $P_{cd}(t,n)$, as follows:

$$H_{fiber}(f,n) = FT\{P_{cd}(t,n)\}/FT\{R(t)\}$$

with $P_{cd}(t,n) = \Sigma_r D_{cd}(r,t,n) = U_{cd}(r,t)W(r,n)$ and $U_{cd}(r,t) = FT^{-1}\{FT\{(U(r,t)\} \cdot H_{cd}(f,r)\}$ where U(r,t) are the temporal responses of the multimode fiber optical cable, measured using spectrally narrow and temporally short pulses of light with central wavelength $\lambda_c$, injected into a core of the multimode fiber optic cable at series of radial offsets r from the core, and where $H_{cd}(f,r)$ is the chromatic dispersion transfer function calculated at the radial offset r from the Time Of Flight TOF($\lambda$) and the optical spectrum of the transceiver measured at offset $rL(\lambda,r)$: $H_{cd}(f,r) = FT\{L(\lambda,r)TOF(\lambda)\}$.

Although it attempts to take account of both modal and chromatic dispersion for characterizing a multimode fiber system, such a method shows several drawbacks.

First, such a method does not differentiate between the source characterization and the fiber characterization.

Secondly, it relies on an analysis of the complete spectrum collection to compute chromatic dispersion, which implies a quite complicated method.

Last, such a method does not disclose how to use the source and fiber metrics to derive the Effective Bandwidth of a multimode optical fiber link, but only allows determining a bandwidth range, and perhaps a minimum bandwidth of a fiber and a population of laser transmitters.

Document U.S. Pat. No. 6,400,450 discloses a method for qualifying a multimode optical fiber for bandwidth performance when used with a particular laser source. The method combines the modal power distribution (MPD) excited by a particular laser source with the differential mode delay (DMD) characteristic of the fiber. The DMD of the fiber is measured by injecting test pulses into one end of the fiber and detecting the resulting output pulse(s) at the other end. The test pulses are adapted to excite only a small number of the modes supported by the fiber. The test pulses are scanned across the core of the fiber at close intervals with the output pulse(s) stored at each radial position. A weighted sum of the output pulses is formed to determine a time-domain impulse response, where the weighting used corresponds to the MPD excited by the laser source. Bandwidth is then determined by standard methods for transforming the impulse response into the frequency domain. In one embodiment of the invention, a weighted sum of the DMD data is used in the determination of bandwidth; whereas in another embodiment of the invention, a deconvolution algorithm is applied to the DMD data to obtain modal delay times for each of the mode groups of the fiber, which are then combined with the MPD excited by the laser source.

Though interesting, such a method does not allow deriving the Effective Bandwidth of a multimode optical fiber link made of a light source and several multimode fibers. Moreover, the source is only characterized by MPD, which does not allow for an accurate characterization. As regards fiber characterization, the transceiver is emitting pulses, rather than operating at an intended bitrate, like the one achieved during multimode fiber link use.

Document U.S. Pat. No. 6,788,397 discloses a technique for measuring the modal power distribution of an optical source (for example, a laser) launching pulses into a multimode fiber, which involves a characterization of the multimode fiber itself in terms of its differential modal delay. A reverse differential mode delay measurement is then performed to characterize the interaction of the optical source with the multimode fiber. By knowing these characteristics, the modal power distribution of the source into the fiber can then be determined by using a reconstruction algorithm.

Once again, such a technique does not allow deriving the Effective Bandwidth of a multimode optical fiber link made of a light source and several multimode fibers. Moreover, the source is only characterized as a function of mode group. As regards fiber characterization, the transceiver is emitting pulses, rather than operating with digital signals at an intended bitrate, like the one achieved during multimode fiber link use.

Hence, none of the known prior art techniques allows deriving the Effective Bandwidth of a multimode optical fiber link made of a light source and several multimode fibers.

Yet, the Effective Bandwidth value of a multimode optical fiber link is very useful to optimize the system performance, to assess its reach, to assess power penalties or a maximum bit rate achievable for example.

It would hence be desirable to have an improved method for assessing the effective bandwidth of a system comprising a source and two or more multimode fibers, which would take account of both chromatic and modal dispersion effects.

It would also be desirable to have such a method that does not require in situ measurements. It would also be desirable to obtain new metrics that would characterize the source and the multimode fibers, and that could be used to predict system performances.

SUMMARY

According to an embodiment of the invention, a method of characterizing a multimode optical fiber link comprising a light source and at least two multimode fibers is provided. Such a method comprises:
- a step of characterizing said light source by at least three source characteristic curves obtained by:
  - exciting a nominal multimode fiber with said light source being directly modulated with a digital electrical signal at a nominal bit rate;
  - scanning with a single mode fiber an output signal of said nominal multimode fiber, at different radial offset values r, from an axis of said nominal fiber where r=0 to a radial offset value r=a, where a is the core radius of said nominal fiber,
  - analyzing with a spectrum analyzer an output optical spectrum of said single mode fiber for each radial offset value r,
  said source characteristic curves each showing a source parameter as a function of said radial offset value r;
- a step of characterizing each of said multimode fibers using a measurement of the Dispersion Modal Delay (DMD), wherein an output trace of light pulses launched into said multimode fiber at different radial offset values r is detected by using a single mode fiber and wherein said measurement of said DMD is used to calculate, for each of said multimode fibers, at least three fiber characteristic curves as a function of said radial offset value r;
- a step of computing an Effective Bandwidth (EB) of said link, comprising calculating a transfer function using both each of said source characteristic curves and each of said at least three fiber characteristic curves for each of said multimode fibers.

The invention thus relies on a new and inventive approach of the characterization of multimode optical fiber links comprising two ore more multimode fibers, which length is big enough to have an impact on the Effective Bandwidth of the optical link. It is actually based on the finding that source and fibers do interact on the system performance, and that it is thus not reliable to compute separately the Effective Modal Bandwidth and the Chromatic Dispersion Bandwidth to take account of both the modal and chromatic dispersion phenomena.

The method according to an embodiment of the invention allows isolating the relevant metrics that characterize the source and the different spans of fibers, and provides a new way of processing them to assess the Effective Bandwidth of the optical link. In other words, according to such a method, the different fibers and the source can be characterized separately, without the need to make the link physically to assess its potential. Yet, the interaction between modal and chromatic dispersions is restored.

The characterization of the source relies on a new technique, which is somehow similar in its approach to the DMD measurement technique as specified in IEC 60793-1-49 and FOTP-220 standards. The characterization of each multimode fiber relies on this standardized DMD measurement technique.

Such a method for characterizing a multimode optical fiber link can advantageously be used in the framework of fiber manufacturing to support a method of qualifying concatenation of fibers offering a minimal EB for a given set of transceivers. It may also be used for qualifying the effect of additional active or passive components inserted in a link, through the monitoring of their effect on the source and/or fiber metrics, as well as the consequences on the Effective Bandwidth of a link.

More generally, such a method allows optimizing the concatenation of multimode fibers by choosing the right fibers to concatenate without actual bandwidth measurements of concatenated link bandwidth. It allows assessing efficiently the expected bandwidth of the concatenation from the knowledge of specific fiber and source metrics measured separately. It thus allows for compensation of modal and/or chromatic dispersion of multimode fibers through fiber concatenation.

According to an embodiment of the invention, optimization of the optical link is made by computations, which is much faster and cheaper than actual measurements, which are most of the time practically unachievable, as they require too much time and resources.

Moreover, this method is not limited to the 840-860 nm wavelength range, and can be applied for sources emitting over the whole available spectrum range available for data communications with optical fibers, for instance over the 633-1625 nm range and even beyond 1625 nm, around 2 µm for instance. It is not either limited to VCSEL based sources, and can be used with DFB (for "Distributed FeedBack") lasers, LED (for "Light Emitting Diodes") or Silicon Photonic sources for instance. It is particularly suited to spectrally wide sources, transversally and/or longitudinally multimode sources. It can be used for instance to tune the EB of an installed link by adding an adequate fiber to enlarge or shift an operating wavelength range (i.e. a link originally designed to operate at 850 nm+/−10 nm tuned for optimal operations over 850-950 nm).

Moreover, this method is not limited to 50 µm graded-index multimode fibers: it can be applied to smaller core diameters from 10 to 50 µm or larger core diameters from 50 to 100 µm for instance. Moreover, this method is not limited to graded-index multimode fibers and is particularly suited to any fiber sustaining more than one mode at the operating wavelengths of interest.

Multimode fibers forming the optical link may be of the same type, or of different types (e.g. OM3 and OM4 fibers or OM3/4 with different glass compositions). However, their core diameters and numerical aperture are targeted to be substantially the same (±10%).

As used herein multimode optical fiber is an optical fiber able to transmit more than one mode at the intended operating wavelengths.

In another aspect, said source characteristic curves comprise:
- a curve showing a received coupled power $P_{source}(r)$ of said source as a function of said radial offset value r, $0 \leq r \leq a$;
- a curve showing a center wavelength $\lambda_c(r)$ of said source as a function of said radial offset value r, $0 \leq r \leq a$;
- a curve showing a root mean square spectral width $\Delta\lambda(r)$ of said source as a function of said radial offset value r, $0 \leq r \leq a$.

The method according to an embodiment of the invention thus advantageously avoids the use of the full optical spectrum. It rather only considers the center wavelength $\lambda_c(r)$ and the spectral width RMS $\Delta\lambda(r)$ of the source. The inventors have actually demonstrated that such a method was sufficient to reach good results, which was far from being obvious, given the complexity of the spectrum shape.

Moreover, the method according to an embodiment of the invention advantageously uses the metric $\Delta\lambda(r)$ for characterizing the source, which is critical since it provides the right scaling of the resulting Effective Bandwidth that is mandatory for system margin calculations.

Advantageously, said nominal multimode fiber exhibits a length close to said link length. The characterization of the source is thus carried out in conditions similar to the actual optical link.

According to another aspect, said at least three fiber characteristic curves calculated for each of said multimode fibers comprise:
- a curve showing a Radial Offset Bandwidth $ROB(r)$ of said multimode fiber as a function of said radial offset value r, $0 \leq r \leq a_i$;
- a curve showing a Radial Offset Delay $ROD(r)$ of said multimode fiber as a function of said radial offset value r, $0 \leq r \leq a_i$;
- a curve showing a Radial Coupling Power $P_{DMD}(r)$ of said multimode fiber as a function of said radial offset value r, $0 \leq r \leq a_i$, where $a_i$ is the core radius of multimode fiber of index i.

All multimode fibers in the optical link, as well as the nominal multimode fiber used for characterizing the source, have core diameters, which are targeted to be substantially equal, so that $a=a_i \pm 10\%$ for all indexes i.

The three fiber characteristic curves are extracted from the DMD plot. The Radial Offset Bandwidth $ROB(r)$ and the Radial Offset Delay $ROD(r)$ are normalized to the fiber length used in the DMD measurements and are typically and respectively expressed in MHz·km and ps/m.

According to an aspect of the invention, said step of characterizing said light source and said step of characterizing each of said multimode fibers use the same single mode fiber, so as to avoid any discrepancy between the characterization of the source and of the fiber which would be induced by the use of different single mode fibers.

According to an embodiment of the invention, said step of computing an Effective Bandwidth (EB) of said link derives said Effective Bandwidth from a transfer function $\tilde{H}(f)$, where:

$$\tilde{H}(f) = \sum_{r=0}^{r=a} P_{source}(r) \cdot \tilde{P}_{DMD}(r) \cdot$$

$$OMBc(r) \cdot e^{-i2\pi(\Delta\tau(r)+\widetilde{\Delta\tau}_{DMD}(r))f} \cdot e^{-\left(\frac{1}{\tilde{\sigma}_{ch}(r)^2} + \frac{1}{\tilde{\sigma}_{DMD}(r)^2}\right)f^2}$$

with:

$$\tilde{P}_{DMD}(r) = \frac{1}{N}\sum_{i=1}^{N} P_{DMD,i}(r)$$

$$\widetilde{\Delta\tau}(r) = \sum_{i=1}^{N} L_i \cdot CD_i \cdot (\lambda_c(r) - \lambda_{DMD})$$

$$\widetilde{\Delta\tau}_{DMD}(r) = \sum_{i=1}^{N} L_i \cdot ROD_i(r)$$

$$\tilde{\sigma}_{ch}(r) = \frac{0.187}{\Delta\lambda(r) \cdot \sum_{i=1}^{N} L_i \cdot CD_i \cdot \sqrt{0.3 \log_e 10}}$$

$$\frac{1}{\tilde{\sigma}_{DMD}(r)^2} = \sum_{i=1}^{N}\left(\frac{L_i \cdot \sqrt{0.3\log_e 10}}{ROB_i(r)}\right)^2$$

where i is the index of the multimode fiber in said optical link made of N multimode fiber sections, i=1 corresponding to the multimode fiber section closest to said light source, N being an integer greater than or equal to two, $L_i$ is the length in said link of the multimode fiber of index i, $CD_i$ is the chromatic dispersion of the multimode fiber of index i expressed in ps/nm-km, $\lambda_{DMD}$ is the wavelength of said measurement of the Dispersion Modal Delay, and OMBc(r) is the OMBc (for "Overfilled Modal Bandwidth calculated") weight function.

The OMBc weight functions are the weight functions disclosed in "Calculated Modal Bandwidths of an OM4 Fiber and the Theoretical Challenges" by Abhijit Sengupta, International Wire & Cable Symposium, Proceedings of the 58th IWCS/IICIT, pp. 24-29, but tuned to account for the refractive index profile of the nominal fiber. Preferably, $L_i$ is greater than 10 m or greater than 50 m, in order for the fiber span to have an impact on the computation of the Effective Bandwidth.

As an example, said Effective Bandwidth of said optical link is a −3 dB bandwidth of said $\tilde{H}(f)$ transfer function, such that:

$$10 \cdot \log_{10}\left|\frac{\tilde{H}(EB)}{\tilde{H}(0)}\right| = -3.$$

Of course, other ways of deriving EB from $\tilde{H}(f)$ could be used, such as by using a −1.5 dB threshold and multiplying the obtained bandwidth by $\sqrt{2}$, or by using a −6 dB threshold for example.

According to another embodiment of the invention, said chromatic dispersion $CD_i$ for multimode fiber of index i in $\widetilde{\Delta\tau}(r)$ is replaced by a function of the wavelength $CD_i(\lambda)$, such that:

$$\overline{\Delta\tau}(r) = \sum_{i=1}^{N} L_i \cdot \int_{\lambda_{DMD}}^{\lambda_c(r)} CD_i(\lambda) \cdot d\lambda$$

Such a refinement gives interesting results when it is possible to know how chromatic dispersion varies with the wavelength.

According to another embodiment of the invention, said chromatic dispersion $CD_i$ is assumed to be the same for all multimode fibers in said optical link.

According to yet another embodiment of the invention, said modal dispersion is assumed to be the same for all multimode fibers in said optical link.

Such assumptions simplify the computation of the Effective Bandwidth for fiber concatenations.

Embodiments of the invention also concern a method of fabricating multimode optical fiber links comprising a light source and at least two multimode optical fibers, the method comprising:
- selecting a set of multimode optical fibers and a set of light sources;
- computing an Effective Bandwidth (EB) of all possible optical links made of one of said light sources and of two or more multimode fibers in said sets in compliance with the method of any of claims 1 to 9;
- selecting only those multimode optical fiber links for which the effective bandwidth EB>3000 MHz-km, more preferably EB>4500 MHz-km, even more preferably EB>6000 MHz-km.

Further embodiments of the invention also concern a method of improving the performance of a multimode optical fiber link comprising a light source and at least two multimode fibers. Such a method comprises:
- computing the Effective Bandwidth of said multimode optical fiber link in compliance with the method of any of claims 1 to 9;
- for at least one of said multimode fibers, repeating the steps of:
  - modifying a length of said multimode fiber;
  - assessing said Effective Bandwidth of said link with said modified length in compliance with the method of any of claims 1 to 9;
- for said at least one of said multimode fibers, selecting the length which corresponds to the greatest Effective Bandwidth for said link.

Embodiments of the invention further concern a method of fabricating multimode optical fiber links comprising a light source and at least two multimode optical fibers, the method comprising:
- selecting a set of multimode optical fibers;
- selecting a set of light sources having different wavelengths in a window of wavelengths sensibly comprised between 850 nm and 950 nm;
- for a concatenation of multimode optical fibers in said set, computing an Effective Bandwidth (EB) of an optical link made of said concatenation of fibers and one of said light sources in said set, in compliance with the method of any of claims 1 to 9, and for each light source in said set;
- repeating said computing step for several concatenation of multimode optical fibers in said set;
- selecting only the concatenation of multimode optical fibers forming multimode optical fiber links for which the effective bandwidth EB>3000 MHz-km, more preferably EB>4500 MHz-km, even more preferably EB>6000 MHz-km over the whole window of wavelengths sensibly comprised between 850 nm and 950 nm.

More generally, the Effective Bandwidth computed according to the method of characterizing a multimode optical link of the invention can be used:
- To sort out/to optimize fibers for a given source or set of sources to optimize system performance (low penalties) and/or to extend the reach;
- To sort out/to optimize sources for a given concatenation of fibers to optimize system performance (low penalties) and/or to extend the reach;
- To assess power penalties/system margins for a given link length and bit rate;
- To assess system reach for a given power penalty level/system margins for a given bit rate;
- To assess maximum bit rate achievable for a given power penalty/system margins and given link length;
- To sort out/to optimize a fiber that would enhance the EB of a given link

BRIEF DESCRIPTION OF THE DRAWINGS

The invention can be better understood with reference to the following description and drawings, given by way of example and not limiting the scope of protection, and in which:

FIG. 4a shows an example of DMD plot resulting from a DMD measurement for a multimode fiber characterized according to an embodiment of the invention;

FIG. 4b illustrates the ROD curve derived from the DMD plot of FIG. 4a;

FIG. 4c illustrates the ROB curve derived from the DMD plot of FIG. 4a;

FIG. 4d illustrates the $P_{DMD}$ curve derived from the DMD plot of FIG. 4a;

FIG. 7b illustrates the root mean square spectral width & of transceivers Tx1 to Tx5, as a function of the radial offset value r, in the exemplary embodiment of FIG. 7a;

The components in the figures are not necessarily to scale, emphasis instead being placed upon illustrating the principles of the invention.

DETAILED DESCRIPTION

The general principle of the invention relies on separate source and fiber characterizations, allowing isolating the relevant metrics that characterize both the source and the different spans of fibers, and a new method for assessing the Effective Bandwidth, starting from these new metrics.

Figure 1:
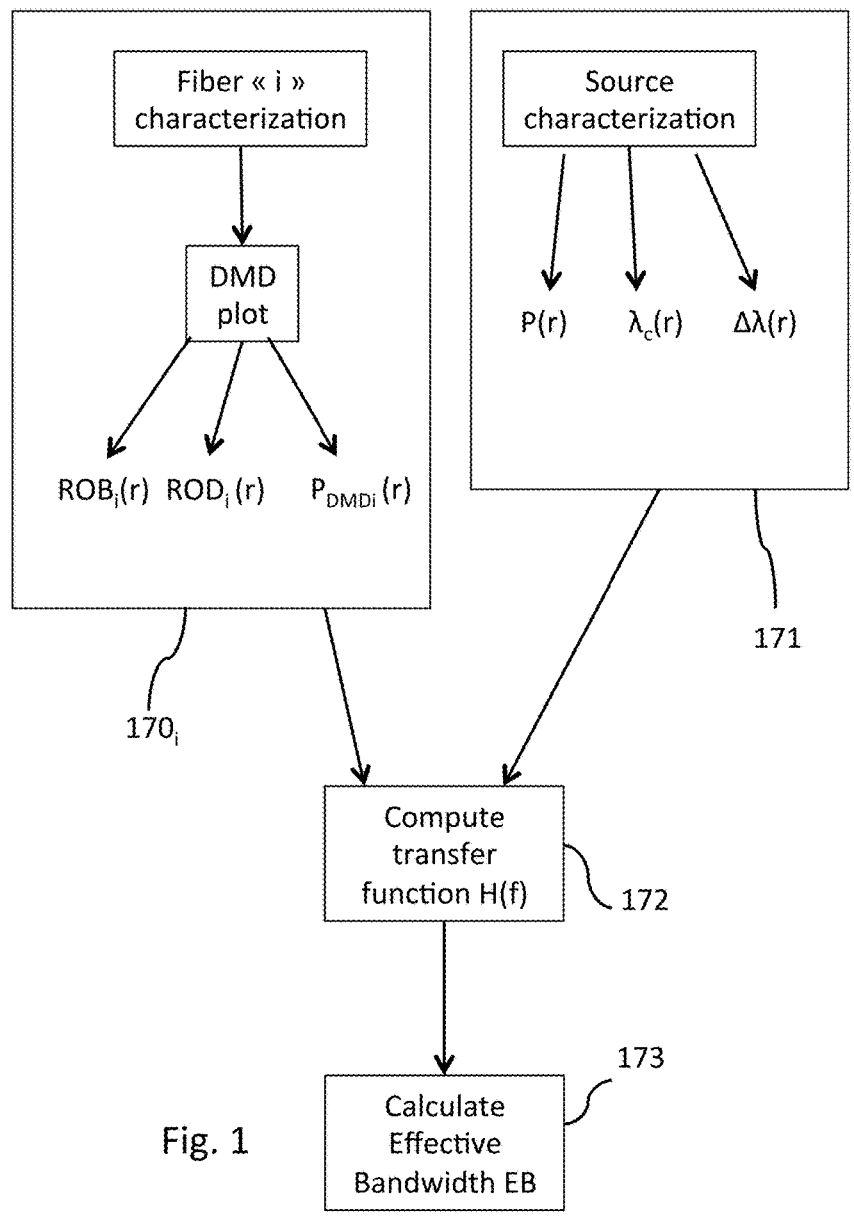
FIG. 1 shows a synoptic diagram of the method of characterizing a multimode optical fiber link according to the invention.

FIG. 1 illustrates by a synoptic diagram the method of characterizing a multimode optical fiber link according to the invention. Such an optical link comprises a source, as well as two or more multimode optical fiber spans. Such a method relies on a characterization $170_i$ of each multimode fiber of index i in the link using a DMD measurement technique. According to an embodiment of the invention, characterization $170_i$ of fiber i yields three fiber characteristic curves derived from the DMD plot.

Such a method also relies on a separate characterization 171 of the source, using a technique similar to the DMD measurement technique, which allows obtaining three source characteristic curves.

Both the fiber characteristic curves delivered by step $170_i$ and the source characteristic curves delivered by step 171 feed a computing step 172 for computing a transfer function H(f). In a step 173, the Effective Bandwidth of the multimode optical fiber link is then derived from the transfer function H(f).

All these steps will be described in more details below in relation to the other figures.

Figure 2:
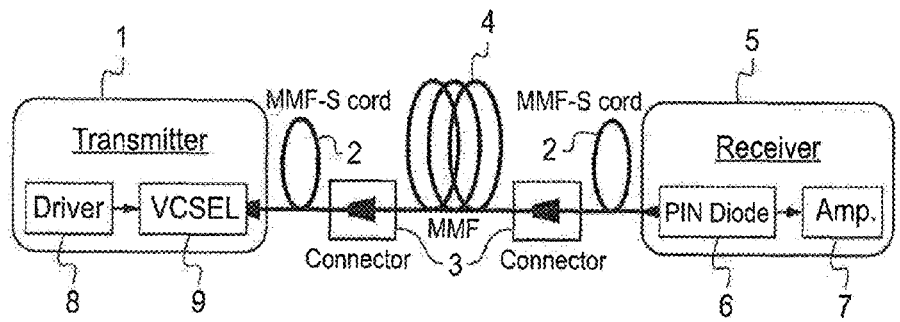
FIG. 2 shows an example of an optical communication system including an optical multimode fiber link.

FIG. 2 shows an example of an optical communication system including a multimode fiber, objet of the present effective bandwidth computing method. A multi Gigabits Ethernet optical communication system successively comprises a driver 8 of a transmitter 1, a VCSEL source 9 of a transmitter 1, a launch cord 2, a connector 3, a multimode fiber link 4, a connector 3, a launch cord 2, a PIN diode 6 of a receiver 5, an amplifier 7 of a receiver 5. A digital signal at 10 Gbps or 25 Gbps or more is generated by the driver 8, which directly modulates the VCSEL source 9.

According to embodiments of the invention, multimode fiber link 4 is made from a concatenation of several multimode fiber spans $4_i$ (though not illustrated in FIG. 1).

Each multimode fiber $4_i$ is characterized, according to embodiments of the invention, based on the DMD measurements, as described in the standard TIA FOTP-220 or IEC 60793-1-49 (TIA-455-220-A, "Differential Mode Delay Measurement of Multimode Fiber in the Time Domain" (January 2003)).

Figure 3:
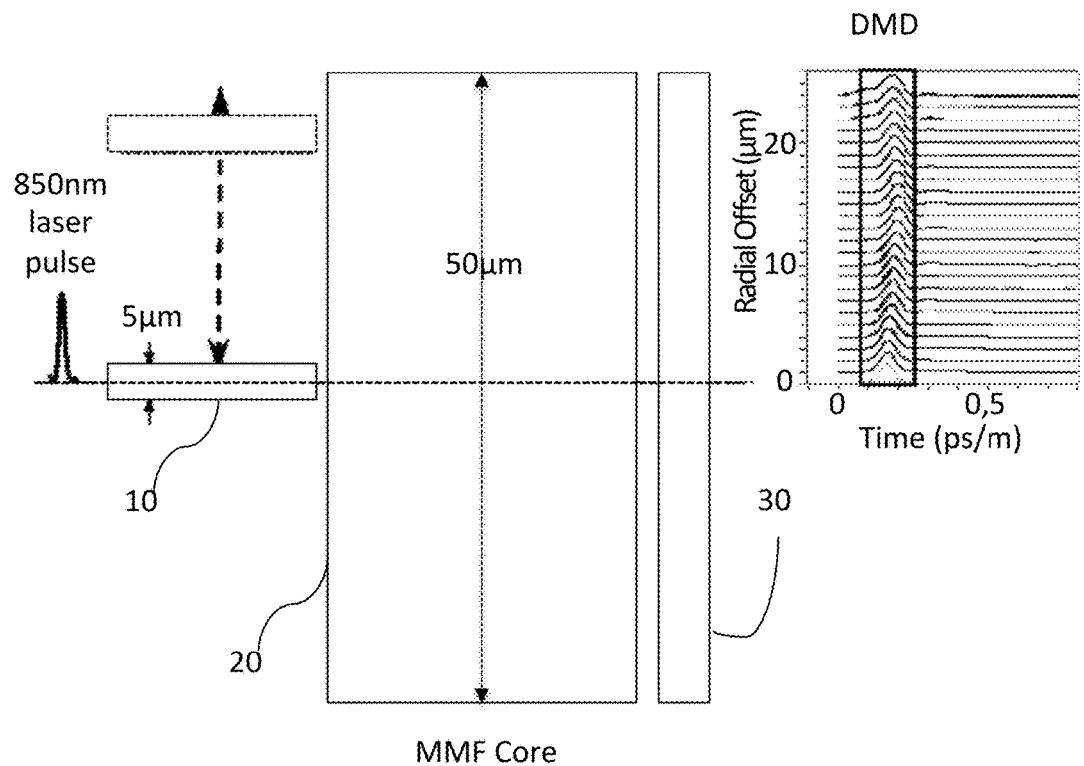
FIG. 3 illustrates the DMD measurement technique.

FIG. 3 illustrates the DMD measurement technique. An ultrafast laser pulse is launched into a multimode fiber MMF using a single mode fiber SMF. The SMF is scanned radially, and for each radial offset position, the shape of the transmitted pulse is recorded using a high bandwidth optical receiver 30 and a sampling oscilloscope.

More precisely, an optical reference pulse $s_{ref}(t)$ at 850 nm is emitted by a source and launched into the core 10 of a single-mode launch fiber SMF, with a core diameter of 5 µm. From the end of the SMF, it is stepped across the core 20 of a multimode fiber MMF under test. Such a MMF has typically a core diameter of 50 µm. For each lateral offset across the core (0 to 24 microns), the propagation delay of the resultant output pulse is recorded. Each output pulse contains only those modes excited at a given input radial position. The output waveforms for each of the radial offsets are plotted along the vertical axis and are displaced by 1-micron increments, as shown on the right part of FIG. 3, also called a DMD plot. The relative pulse delay for each waveform is plotted along the horizontal axis in units of picoseconds per meter (ps/m). The DMD is determined by first measuring the difference pulse in delay using the leading edge of the fastest pulse and the trailing edge of the slowest pulse. From this difference we subtract the temporal width of the launch pulse, which yields the modal dispersion of the fiber.

According to an embodiment of the invention, three curves that characterize the multimode fiber $4_i$ of core radius a are calculated from the DMD plot:

a curve showing a Radial Offset Bandwidth $ROB_i(r)$ of the multimode fiber $4_i$ as a function of the radial offset value r, $0 \leq r \leq a$;

a curve showing a Radial Offset Delay $ROD_i(r)$ of the multimode fiber $4_i$ as a function of the radial offset value r, $0 \leq r \leq a$;

a curve showing a Radial Coupling Power $P_{DMD_i}(r)$ of the multimode fiber $4_i$ as a function of the radial offset value r, $0 \leq r \leq a$, which may be expressed as a relative power.

The Radial Offset Bandwidth is described in several prior art documents, among which patent document EP2207022. As described in this patent document, the radial offset bandwidth ROB(r) is defined as the −3 dB bandwidth of a transfer function $$H^r(f) = \frac{S_s(f, r)}{S_e(f)},$$

where:

$S_e(f)$ is the Fourier transform of the time profile of the inlet pulse $s_e(t)$, launched in the DMD measurement, $S_s(f,r)$ is the Fourier transform of the time profile of the outlet pulse $s_s(t,r)$ for a radial offset r, at the output of the multimode fiber under test, and f indicates frequency.

An interesting characteristic of the ROB is its high sensitivity to localized defects in refractive index. Hence, if the ROB decreases too quickly on increasing the radial offset r, then it is likely that the fiber presents an irregular index profile.

ROB is normalized to the fiber length in the DMD measurement and is generally expressed in MHz·km, or GHz·km.

As regards the ROD, it corresponds to the mean temporal position of the fiber output response for a given delay.

The ROD curve for the fiber somehow corresponds to the $\lambda_c$ curve for the source, while the ROB curve for the fiber somehow corresponds to the $\Delta\lambda$ curve for the source.

ROD is normalized to the fiber length used in the DMD measurements to be expressed typically in ps/m. Note that the absolute value of the ROD is not relevant, only the relative value between offset launches matters.

Figure 4:
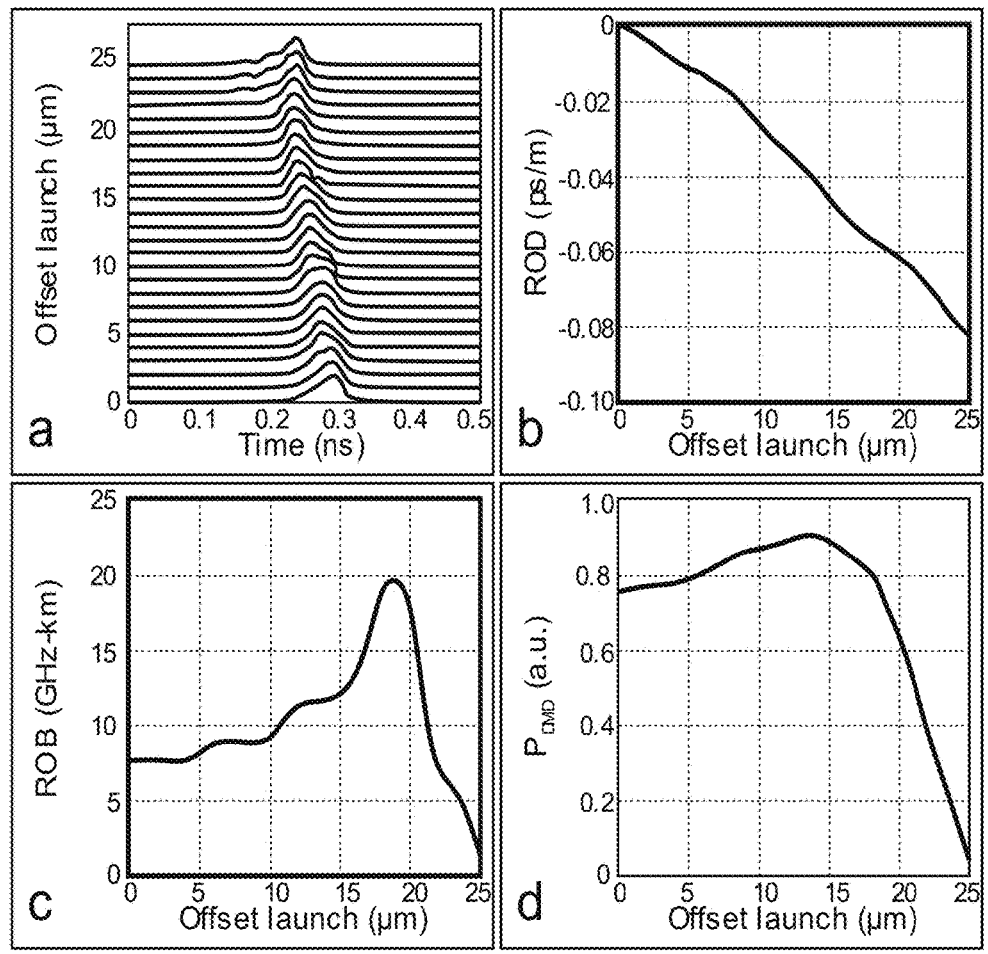

FIG. 4a illustrates a DMD plot obtained by characterizing a multimode fiber through a DMD measurement technique. FIGS. 4b to 4d show respectively the ROD curve, the ROB curve and the $P_{DMD}$ curve as a function of the radial offset value derived from the DMD plot according to an embodiment of the invention.

Figure 5:
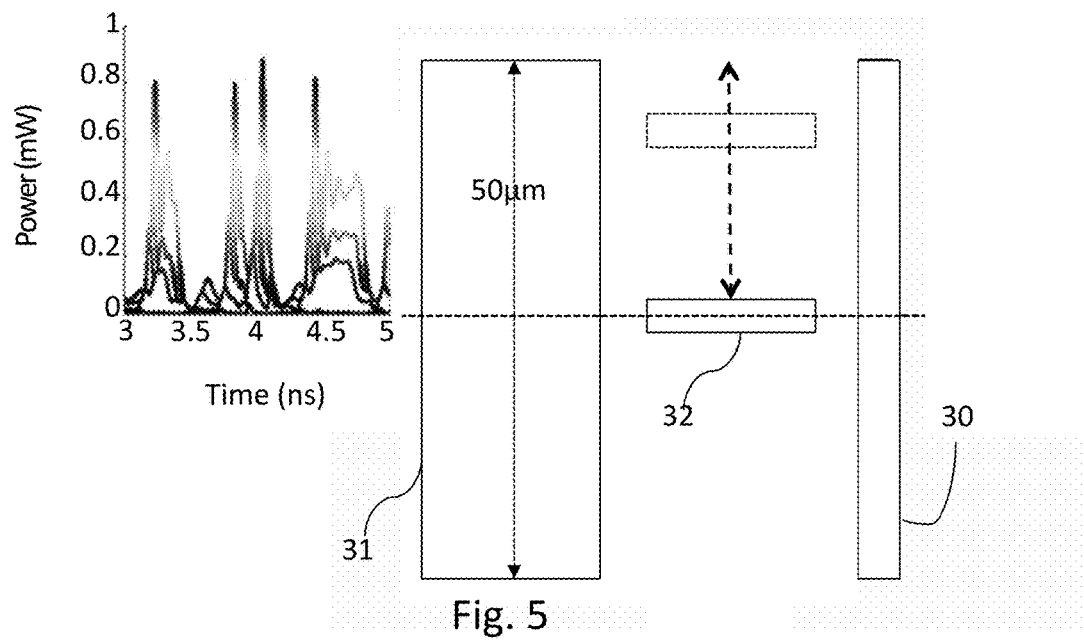
FIG. 5 illustrates the source characterization technique according to embodiments of the invention.

FIG. 5 illustrates the source characterization technique according to embodiments of the invention. This characterization is similar to that of the DMD measurement technique.

A nominal multimode graded-index fiber, with a core 31 showing a diameter of 50 µm, is first excited with the source to be characterized. The source is excited with a typical digital electrical signal, than can be obtained with a pattern generator used with a pseudo random bit sequence, at a typical bit rate. Such a digital electrical signal is illustrated on FIG. 5, which shows the power of the signal, expressed in mW, as a function of time, expressed in ns. As may be observed, the pattern of such a digital signal illustrates the possible multimode nature of the source. The nominal multimode graded-index fiber has sensibly the same core diameter and numerical aperture as the multimode fibers used in the link. Actually, it must be noted that the multimode fibers in the link preferably have sensibly the same core diameter (±10%) and the same numerical aperture (±10%). However, some of them may be for example OM3 fibers, and some others OM4 fibers. A single mode fiber 32 scans the output of the nominal fiber, in a manner similar to that used in the standard DMD measurements, thus preferably from 0 to 25 µm, with a 1-micron step. A larger step, e.g. 2 µm supported by interpolation can also be done. An optical spectrum analyzer 30 placed at the output of the single mode fiber 32 records the output optical spectrum for each position of the SMF.

Without lack of generality, the single mode fiber 32 used for the source characterization, also called probe fiber, may be the same as the single mode fiber 10 used for the fiber characterization.

Although not illustrated on FIG. 5, such a technique allows collecting a series of optical spectra, which have to be post-processed, so as to generate three source characteristic curves, namely:
- a curve showing the received coupled power $P_{source}(r)$ of the source as a function of the radial offset value r of the SMF 32, $0 \leq r \leq a$. Such a power may be expressed as a relative power;
- a curve showing a center wavelength $\lambda_c(r)$ of the source as a function of the radial offset value r of the SMF 32, $0 \leq r \leq a$;
- a curve showing a root mean square spectral width $\Delta\lambda(r)$ of the source as a function of the radial offset value r of the SMF 32, $0 \leq r \leq a$, where a is the core radius of the multimode nominal fiber 31.

Figure 6:
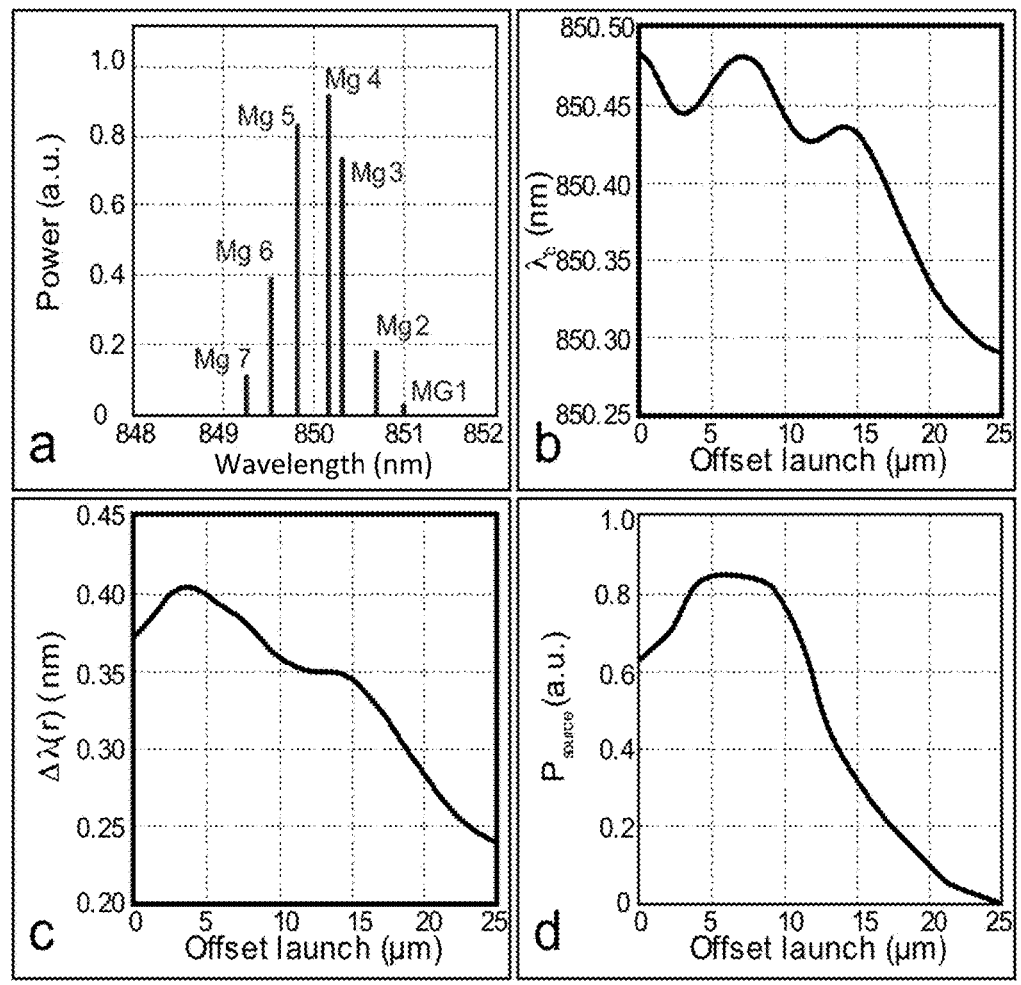
FIG. 6a shows the optical spectrum of a source characterized with the technique of FIG. 5 in an exemplary embodiment of the invention.
FIG. 6b depicts the center wavelength $\lambda_c(r)$ as a function of the radial offset value of a source characterized with the technique of FIG. 5 in an exemplary embodiment of the invention.
FIG. 6c illustrates the root mean square spectral width $\Delta\lambda(r)$ as a function of the radial offset value of a source characterized with the technique of FIG. 5 in an exemplary embodiment of the invention.
FIG. 6d illustrates the output power P(r) as a function of the radial offset value of a source characterized with the technique of FIG. 5 in an exemplary embodiment of the invention.

In an exemplary embodiment of the invention, the inventors have simulated the coupling between a transversally multimode (and longitudinally single mode) laser into a 50 µm graded-index multimode fiber. As shown in FIG. 6a, such a source exhibits seven mode groups, named MG1 to MG7. As can be read on FIG. 6a, the center wavelength $\lambda_c$ is 850.0 nm. The position of the source with respect to the nominal multimode fiber 31 is arbitrarily chosen.

FIGS. 6b to 6d illustrate the three curves that characterize the source-fiber coupling, according to the technique of FIG. 5: more precisely, FIG. 6d illustrates the output power $P_{source}(r)$ of the source as a function of the radial offset value; FIG. 6b illustrates the center wavelength $\lambda_c(r)$ of the source as a function of the radial offset value; FIG. 6c depicts the root mean square spectral width $\Delta\lambda(r)$ of the source as a function of the radial offset value. It is interesting to note that the RMS spectral width $\Delta\lambda(r)$ also significantly varies along the fiber core 31.

Once a DMD measurement has been carried out for characterizing each multimode fiber under test, and once the source has been characterized using the technique of FIG. 5, the method of the invention proposes to compute the Effective Bandwidth of the multimode optical fiber link, made of the source and several spans of multimode fibers.

Using the three fiber-characteristic curves of FIGS. 4b to 4d for each multimode fiber $4_i$ along with the three source-characteristic curves of FIGS. 6b to 6d, the method according to an embodiment of the invention proposes to compute the Effective Bandwidth (hereafter called EB) as the bandwidth at −3 dB of the transfer function H(f), such that:

$$10 \cdot \log_{10}\left|\frac{H(EB)}{H(0)}\right| = -3.$$

Assuming Gaussian and independent radial transfer functions or modal $$\left(P_{DMD}(r) \cdot e^{-\left(\frac{1}{\sigma_{DMD}(r)^2}\right)f^2}\right)$$

and chromatic $$\left(P_{source}(r) \cdot e^{-\left(\frac{1}{\sigma_{ch}(r)^2}\right)f^2}\right)$$

dispersions, and taking into account the delays between these radial transfer functions respectively induced by chromatic ($\Delta\tau(r)$) and modal ($\Delta\tau_{DMD}(r)$) dispersions, the total transfer function resulting from the coupling between a source and a fiber can be expressed with these metrics as follows:

$$H(f) = \sum_{r=0}^{r=a} P_{source}(r) \cdot P_{DMD}(r) \cdot$$
$$OMBc(r) \cdot e^{-i2\pi(\Delta\tau(r)+\Delta\tau_{DMD}(r))f} \cdot e^{-\left(\frac{1}{\sigma_{ch}(r)^2}+\frac{1}{\sigma_{DMD}(r)^2}\right)f^2}$$

where:

$\Delta\tau(r) = L \cdot CD \cdot (\lambda_c(r) - \lambda_{DMD})$ is the delay induced by the chromatic dispersion (CD) expressed in ps/nm/km, with L the multimode fiber length in said link (e.g. 500 m), $\lambda_{DMD}$ is the wavelength of the DMD measurements that is also the operating wavelength of the link, $\Delta\tau_{DMD}(r) = L \cdot ROD(r),$ $$\sigma_{ch}(r) = \frac{0.187}{\Delta\lambda(r) \cdot L \cdot CD \cdot \sqrt{0.3 \cdot \log_e 10}}$$

is linked to the chromatic dispersion CD bandwidth, and $$\sigma_{DMD}(r) = \frac{ROB(r)}{L \cdot \sqrt{0.3 \cdot \log_e 10}}$$

The OMBc (for "Overfilled Modal Bandwidth calculated") are the weight functions corresponding to over-filled launch.

More information on OMBc weight functions can be found in "Calculated Modal Bandwidths of an OM4 Fiber and the Theoretical Challenges" by Abhijit Sengupta, International Wire & Cable Symposium, Proceedings of the 58$^{th}$ IWCS/IICIT, pp. 24-29. As disclosed in this document, overfilled modal bandwidth calculated (OMBc) of a multi-mode fiber can be predicted from the weighted linear combination of differential modal delay data. Actually, coupled power in each mode is calculated from the overlap integral of a Gaussian mode field of a single mode probe fiber (SMPF) and the specific mode of the MMF for each radial offset position. The coupling efficiency at each radial offset is calculated as the total coupled power summed over all modes normalized to unit incident power. The overfilled launch source is expressed as a linear combination of SMPF modes fields at the radial offset positions of the DMD scan. Per the definition of OFL, the weights for different offset positions are optimized so that the total energy in each mode of the MMF is equal. These theoretical DMD weighting values are tabulated to obtain the OMBc for the DMD data measured from 0-30 microns (i.e. complete DMD data). These weights are then adjusted to provide optimal values for the case where the DMD data does not exist at radii higher than 25 microns.

However, embodiments of the invention deal with a link made of a concatenation of at least two long enough fibers. In that case, the transfer function H(f) is replaced with $\tilde{H}(f)$, which is calculated as follows:

$$\tilde{H}(f) = \sum_{r=0}^{r=a} P_{source}(r) \cdot \tilde{P}_{DMD}(r) \cdot$$

$$OMBc(r) \cdot e^{-i 2\pi (\tilde{\Delta\tau}(r) + \tilde{\Delta\tau}_{DMD}(r))f} \cdot e^{-\left(\frac{1}{\sigma_{ch}(r)^2} + \frac{1}{\sigma_{DMD}(r)^2}\right) f^2}$$

with:

$$\tilde{P}_{DMD}(r) = \frac{1}{N} \cdot \sum_{i=1}^{N} P_{DMD,i}(r)$$

$$\tilde{\Delta\tau}(r) = \sum_{i=1}^{N} L_i \cdot CD_i \cdot (\lambda_c(r) - \lambda_{DMD})$$

$$\tilde{\Delta\tau}_{DMD}(r) = \sum_{i=1}^{N} L_i \cdot ROD_i(r)$$

$$\tilde{\sigma}_{ch}(r) = \frac{0.187}{\Delta\lambda(r) \cdot \sum_{i=1}^{N} L_i \cdot CD_i \cdot \sqrt{0.3 \cdot \log_e 10}}$$

$$\frac{1}{\tilde{\sigma}_{DMD}(r)^2} = \sum_{i=1}^{N} \left(\frac{L_i \cdot \sqrt{0.3 \cdot \log_e 10}}{ROB_i(r)}\right)^2$$

where i is the index of the fiber in the concatenated link made of N fiber sections: i=1 is the first fiber section, i.e. the closest to the source.

Hence, assuming we have a collection of source and fiber pieces for which the corresponding and above-mentioned metrics are known, embodiments of the invention allow calculating the effective bandwidth according to the above formula of all possible links to find the best link, i.e. the link that deliver the largest effective bandwidth.

It should be noted that $\tilde{P}_{DMD}(r)$ is expected to be more or less the same for all fibers when they are of the same type. In embodiments of the invention, it is assumed that the connection between two fibers does not mix the mode. Therefore we can use the $P_{DMD,i}(r)$ of any of the fibers. In the above formula, we propose to use the average.

In practice, there are also connectors between fibers to form the optical link. Ideally, the connectors do not mix or filter the mode groups. In other words, placing a connector at the fiber output during the fiber metric assessment is not expected to change the metric of the fiber.

Note that $\Delta\tau(r)$ in the formula can be refined as follows:

$$\Delta\tau(r) = L \cdot \int_{\lambda_{DMD}}^{\lambda_c(r)} CD(\lambda) \cdot d\lambda$$

$$\tilde{\Delta\tau}(r) = \sum_{i=1}^{N} L_i \cdot \int_{\lambda_{DMD}}^{\lambda_c(r)} CD_i(\lambda) \cdot d\lambda$$

in case we know how Chromatic Dispersion varies with the wavelength.

One can also assume that the chromatic dispersion is substantially equal for all fiber pieces, or that the modal dispersion is the same. These assumptions simplify the formula of concatenations.

One can also imagine assessing the effect of a fiber shortening on the fiber performances, or define the specification of the fiber metric of one or several spans to add, in order to improve the performance of the whole link at one or several wavelengths.

FIGS. 7a to 7d illustrate the source characteristic curves derived according to an embodiment of the invention for five transceivers called Tx1 to Tx5 operating at 10 Gbps.

Figure 7A:
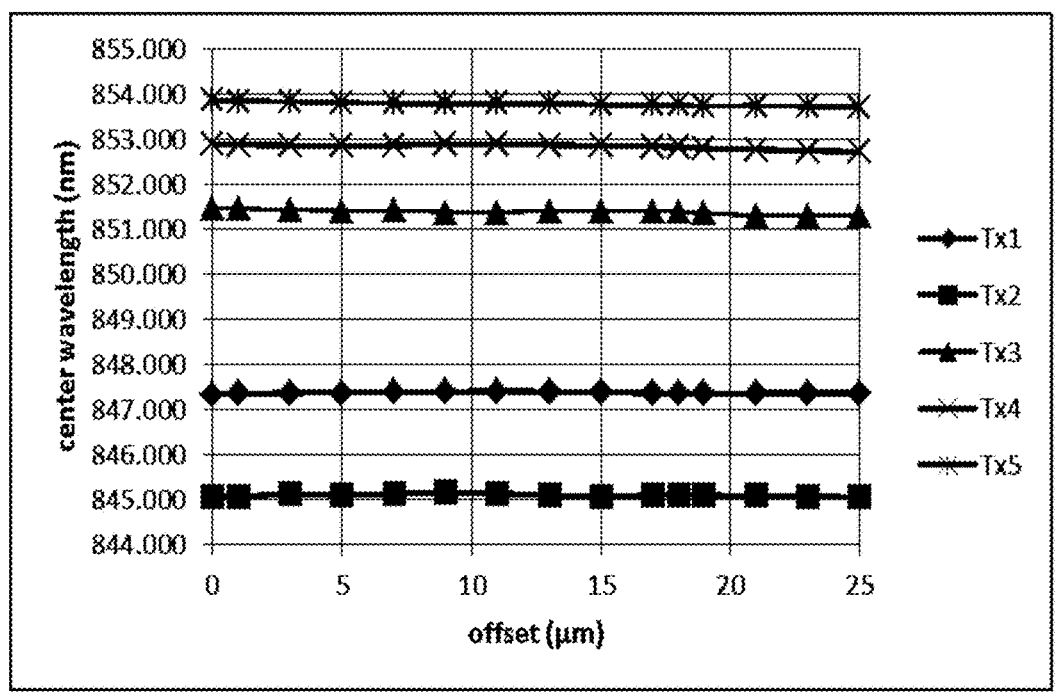
FIG. 7a shows the center wavelength $\lambda_c(r)$ as a function of the radial offset value of five transceivers Tx1 to Tx5 in an exemplary embodiment of the invention.
Figure 7B:
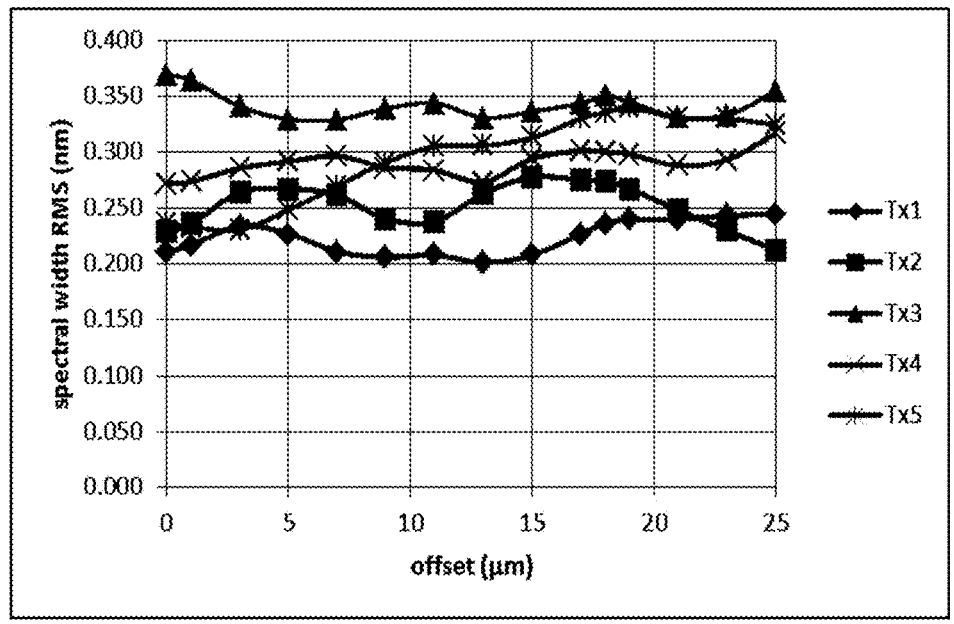
Figure 7C:
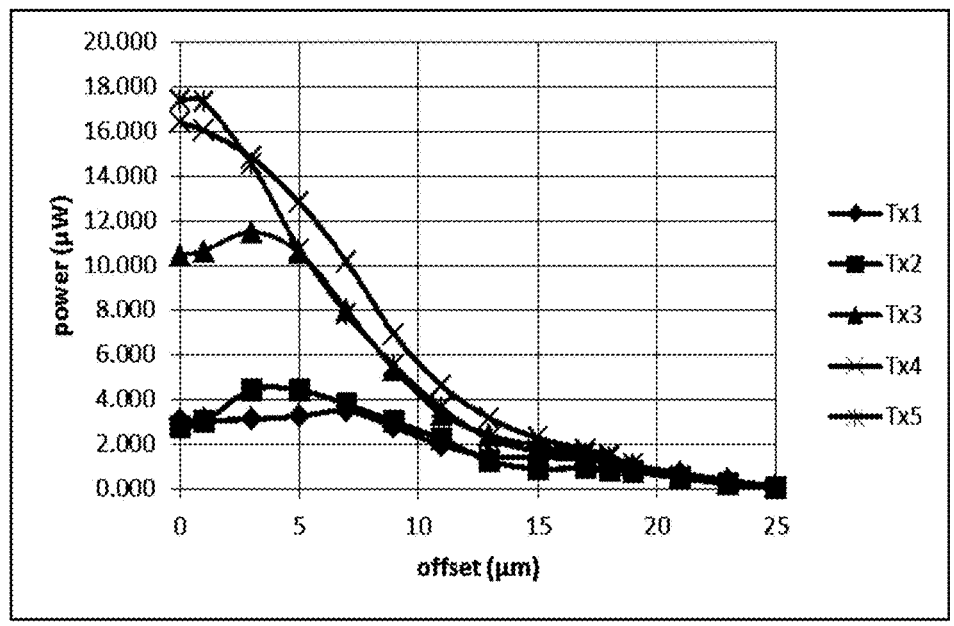
FIG. 7c illustrates the output power P source of transceivers Tx1 to Tx5 as a function of the radial offset value r in the exemplary embodiments of FIGS. 7a and 7b.
Figure 7D:
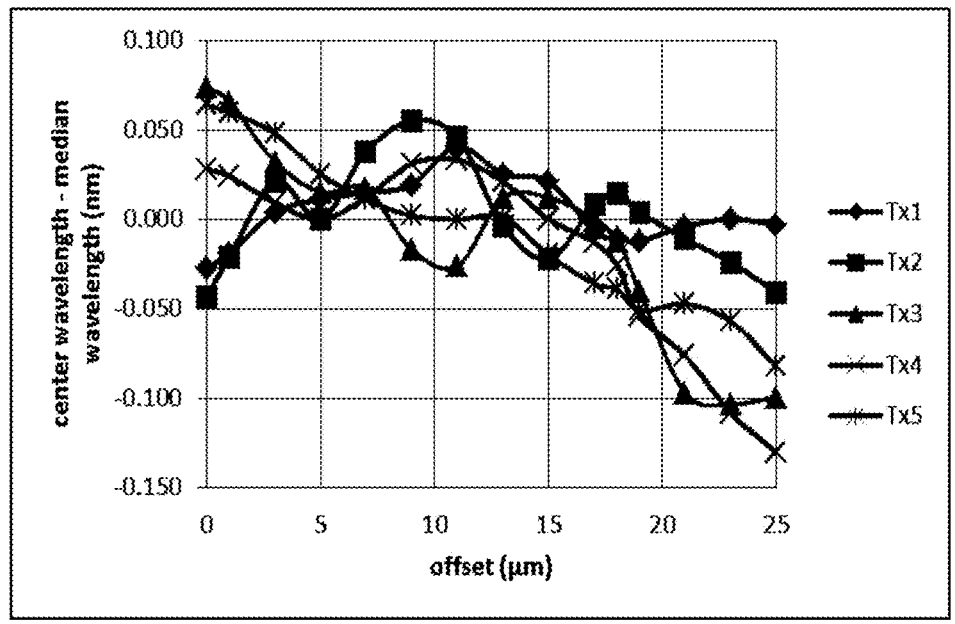
FIG. 7d illustrates the difference between the center wavelength and the median wavelength of transceivers Tx1 to Tx5 as a function of the radial offset value r in the exemplary embodiments of FIGS. 7a to 7c.

More precisely, FIG. 7a illustrates the center wavelength $\lambda_c$ of the transceiver, expressed in nm, as a function of the radial offset value r expressed in µm for transceivers Tx1 to Tx5; FIG. 7b illustrates the root mean square spectral width $\Delta\lambda$ of the transceiver, expressed in nm, as a function of the radial offset value r expressed in µm for transceivers Tx1 to Tx5; FIG. 7c illustrates the output power $P_{source}$ of the transceiver, expressed in µW, as a function of the radial offset value r expressed in µm for transceivers Tx1 to Tx5; FIG. 7d illustrates the difference between the center wavelength and the median wavelength of the transceiver, expressed in nm, as a function of the radial offset value r expressed in μm for transceivers Tx1 to Tx5.

Figure 8A:
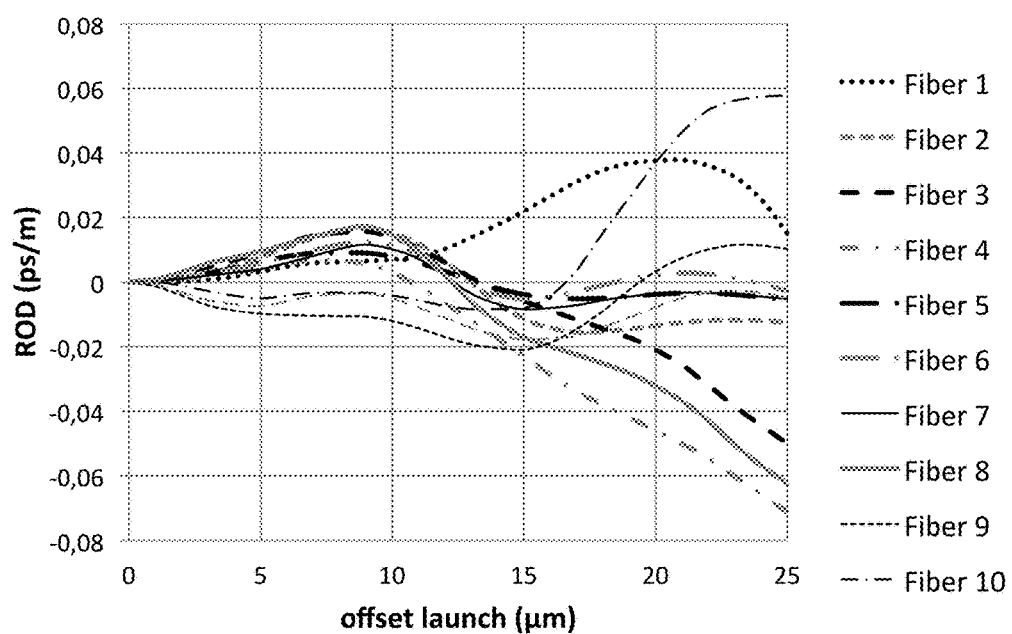
FIGS. 8a to 8c illustrate the three fiber characteristic curves derived according to an embodiment of the invention for ten multimode fibers called Fiber 1 to Fiber 10.
Figure 8B:
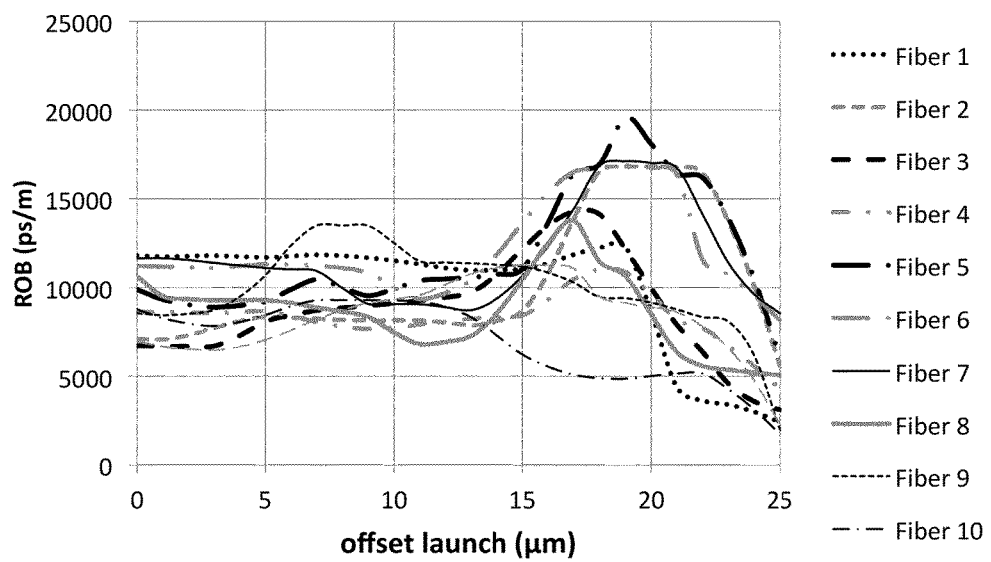
Figure 8C:
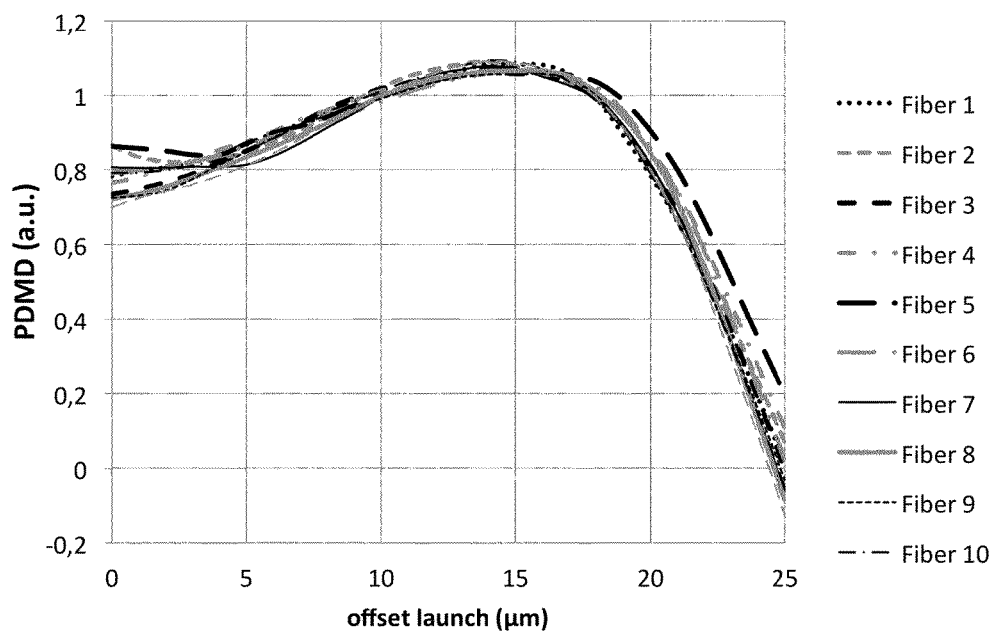

FIGS. 8a to 8c illustrate the three fiber characteristic curves derived according to an embodiment of the invention for ten multimode fibers called Fiber 1 to Fiber 10.

More precisely, FIG. 8a illustrates, for each of the ten fibers, the Radial Offset Delay ROD(r) expressed in ps/m as a function of the radial offset value r; FIG. 8b illustrates, for each of the ten fibers, the Radial Offset Bandwidth ROB(r) expressed in ps/m as a function of the radial offset value r; FIG. 8c illustrates, for each of the ten fibers, the Radial Coupling Power $P_{DMD}(r)$ as a function of the radial offset value r.

The inventors have computed the Effective bandwidth of all possible optical links made of one the sources Tx1 to Tx5 and of a concatenation of two fibers of same length, chosen among the ten fibers Fiber 1 to Fiber 10.

Figure 9:
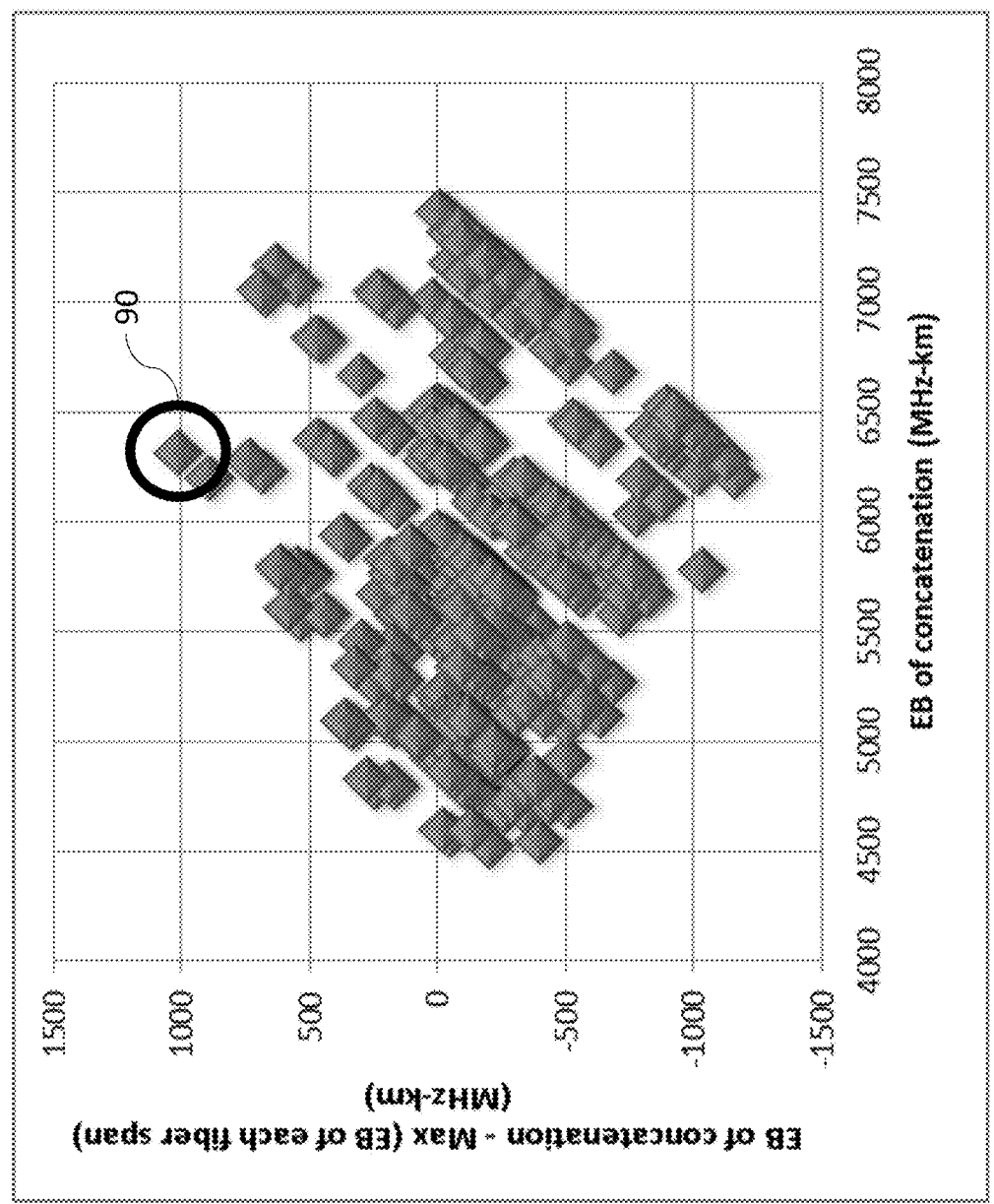
FIG. 9 illustrates the Effective bandwidth improvement, achieved through concatenation of fibers, for optical links made of transceivers Tx1 to Tx5 of FIGS. 7a to 7d and fibers Fiber 1 to Fiber 10 of FIGS. 8a to 8c.

FIG. 9 illustrates the Effective bandwidth improvement, achieved through concatenation of fibers. More precisely, for each possible optical link symbolized with a square form, FIG. 9 illustrates:
- on the Y axis, the difference between the Effective Bandwidth obtained for the concatenation of fibers and the maximum Effective Bandwidth of the two fibers making the optical link (EB of concatenation-Max (EB of each fiber span), expressed in MHz-km;
- on the X axis, the Effective Bandwidth obtained for the concatenation of fibers (EB of concatenation, expressed in MHz-km).

For a given optical link, when the difference between the EB of the concatenation and the maximum EB of the two fibers making the link is positive, it means that the concatenation of fibers improves the total bandwidth: in other words, the modal and chromatic dispersion of one fiber compensate for one or the other of the second fiber.

On FIG. 9, the circled square form referenced as 90 corresponds to the optical link, which Effective Bandwidth was best improved thanks to concatenation of fibers, as compared to an optical link comprising a single span of fiber. This best improvement occurs for transceiver Tx1 coupled with a span of multimode fiber Fiber 4 (showing an Effective Bandwidth EB=5300 MHz-km) and a span of multimode fiber Fiber 10 (showing an Effective Bandwidth EB=5270 MHz-km): actually, the Effective Bandwidth of the optical link thus built shows an Effective Bandwidth EB=6300 MHz-km. The Effective Bandwidth of the optical link thus shows an increase of around 1000 MHz-km, thanks to the concatenation of fibers.

The method according to embodiments of the invention allow isolating and extracting the relevant information for characterizing both a source and multimode fibers, into a single set of curves for the source and into a single set of curves for each fiber. A standardized use of such a method would hence considerably simplify sorting method and/or link engineering, and make easier the collaboration between source and fiber manufacturers.

The invention claimed is:

1. A method of characterizing a multimode optical fiber link comprising a light source and at least two multimode fibers, the method comprises:
   a step of characterizing said light source by at least three source characteristic curves obtained by:
      exciting a nominal multimode fiber with said light source being directly modulated with a digital electrical signal at a nominal bit rate;
      scanning with a single mode fiber an output signal of said nominal multimode fiber, at different radial offset values r, from an axis of said nominal fiber where r=0 to a radial offset value r=a, where a is the core radius of said nominal fiber,
      analyzing with a spectrum analyzer an output optical spectrum of said single mode fiber for each radial offset value r,
      said source characteristic curves each showing a source parameter as a function of said radial offset value r;
   a step of characterizing each of said multimode fibers using a measurement of the Dispersion Modal Delay (DMD), wherein an output trace of light pulses launched into said multimode fiber at different radial offset values r is detected by using a single mode fiber and wherein said measurement of said DMD is used to calculate, for each of said multimode fibers, at least three fiber characteristic curves as a function of said radial offset value r; and
   a step of computing an Effective Bandwidth (EB) of said link, comprising calculating a transfer function using both each of said source characteristic curves and each of said at least three fiber characteristic curves for each of said multimode fibers.

2. The method according to claim 1, wherein said source characteristic curves comprise:
   a curve showing a received coupled power $P_{source}(r)$ of said source as a function of said radial offset value r, 0<r<a;
   a curve showing a center wavelength $\lambda_c(r)$ of said source as a function of said radial offset value r, 0≤r≤a;
   a curve showing a root mean square spectral width $\Delta\lambda(r)$ of said source as a function of said radial offset value r, 0≤r≤a.

3. The method according to claim 1, wherein said at least three fiber characteristic curves calculated for each of said multimode fibers comprise:
   a curve showing a Radial Offset Bandwidth ROB(r) of said multimode fiber as a function of said radial offset value r, 0≤r≤$a_i$;
   a curve showing a Radial Offset Delay ROD(r) of said multimode fiber as a function of said radial offset value r, 0≤r≤$a_i$;
   a curve showing a Radial Coupling Power $P_{DND}(r)$ of said multimode fiber as a function of said radial offset value r, 0≤r≤$a_i$,
where $a_i$ is the core radius of multimode fiber of index i.

4. The method according to claim 3, wherein said step of characterizing said light source and said step of characterizing each of said multimode fibers use the same single mode fiber.

5. The method according to claim 1, wherein said step of computing Effective Bandwidth (EB) of said link derives said Effective Bandwidth from a transfer function $\tilde{H}(f)$, where:

$$\tilde{H}(f) = \sum_{r=0}^{r=a} P_{source}(r) \cdot \tilde{P}_{DMD}(r) \cdot OMBc(r) \cdot e^{-i2\pi(\tilde{\Delta}\tau(r) + \tilde{\Delta}\tau_{DMD}(r))f} \cdot e^{-\left(\frac{1}{\sigma_{ch}(r)^2} + \frac{1}{\sigma_{DMD}(r)^2}\right)f^2}$$

with:

$$\tilde{P}_{DMD}(r) = \frac{1}{N} \cdot \sum_{i=1}^{N} P_{DMD,i}(r)$$

-continued $$\widetilde{\Delta\tau}(r) = \sum_{i=1}^{N} L_i \cdot CD_i \cdot (\lambda_c(r) - \lambda_{DMD})$$

$$\widetilde{\Delta\tau}_{DMD}(r) = \sum_{i=1}^{N} L_i \cdot ROD_i(r)$$

$$\tilde{\sigma}_{ch}(r) = \frac{0.187}{\Delta\lambda(r) \cdot \sum_{i=1}^{N} L_i \cdot CD_i \cdot \sqrt{0.3 \cdot \log_e 10}}$$

$$\frac{1}{\tilde{\sigma}_{DMD}(r)^2} = \sum_{i=1}^{N} \left( \frac{L_i \cdot \sqrt{0.3 \cdot \log_e 10}}{ROB_i(r)} \right)^2$$

where i is the index of the multimode fiber in said optical link made of N multimode fiber sections, i=1 corresponding to the multimode fiber section closest to said light source, N being an integer greater than or equal to two, $L_i$ is the length in said link of the multimode fiber of index i, $CD_i$ is the chromatic dispersion of the multimode fiber of index i expressed in ps/nm-km, $\lambda_{DMD}$ is the wavelength of said measurement of the Dispersion Modal Delay, and OMBc(r) is the OMBc (for "Overfilled Modal Bandwidth calculated") weight netion.

6. The method according to claim 5, wherein said Effective Bandwidth of said optical link is a −3 dB bandwidth of said $\tilde{H}(f)$ transfer function.

7. The method according to claim 5, wherein said chromatic dispersion $CD_i$ for multimode fiber of index i in $\widetilde{\Delta\tau}(r)$ is replaced by a function of the wavelength $CD_i(\lambda)$, such that:

$$\widetilde{\Delta\tau}(r) = \sum_{i=1}^{N} L_i \cdot \int_{\lambda_{DMD}}^{\lambda_c(r)} CD_i(\lambda) \cdot d\lambda.$$

8. The method according to claim 5, wherein said chromatic dispersion $CD_i$ is assumed to be the same for all multimode fibers in said optical link.

9. The method according to claim 5, wherein modal dispersion is assumed to be the same for all multimode fibers in said optical link.

10. A method of fabricating multimode optical fiber links comprising a light source and at least two multimode optical fibers, the method comprising:
- selecting a set of multimode optical fibers and a set of light sources;
- computing an Effective Bandwidth (EB) of all possible optical links made up of one of said light sources and of two or more multimode fibers in said sets in compliance with the method of claim 1; and
- selecting only those multimode optical fiber links for which the effective bandwidth EB>3000 MHz-km.

11. A method of improving the performance of a multimode optical fiber link comprising a light source and at least two multimode fibers, wherein said method comprises:
- computing the Effective Bandwidth of said multimode optical fiber link in compliance with the method of claim 1;
- for at least one of said multimode fibers, repeating the steps of:
    - modifying a length of said multimode fiber;
    - assessing said Effective Bandwidth of said link with said modified length in compliance with the method of claim 1; and
- for said at least one of said multimode fibers, selecting the length which corresponds to the greatest Effective Bandwidth for said link.

12. A method of fabricating multimode optical fiber links comprising a light source and at least two multimode optical fibers, the method comprising:
- selecting a set of multimode optical fibers;
- selecting a set of light sources having different wavelengths in a window of wavelengths sensibly comprised between 850 nm and 950 nm;
- for a concatenation of multimode optical fibers in said set, computing an Effective Bandwidth (EB) of an optical link made of said concatenation of fibers and one of said light sources in said set, in compliance with the method of claim 1, and for each light source in said set;
- repeating said computing step for several concatenation of multimode optical fibers in said set;
- selecting only the concatenation of multimode optical fibers forming multimode optical fiber links for which the effective bandwidth EB>3000 MHz-km over the whole window of wavelengths sensibly comprised between 850 nm and 950 nm.

* * * * *